(12) United States Patent
Hum et al.

(10) Patent No.: US 6,873,750 B2
(45) Date of Patent: Mar. 29, 2005

(54) ELECTRO-OPTIC MODULATOR WITH RESONATOR

(75) Inventors: Sean V. Hum, Calgary (CA); Robert J. Davies, Calgary (CA); Michal Okoniewski, Calgary (CA)

(73) Assignee: Telecommunications Research Laboratories, Edmonton (CA)

( * ) Notice: Subject to any disclaimer, the term of this patent is extended or adjusted under 35 U.S.C. 154(b) by 55 days.

(21) Appl. No.: 10/389,697

(22) Filed: Mar. 12, 2003

(65) Prior Publication Data

US 2003/0215170 A1 Nov. 20, 2003

Related U.S. Application Data

(60) Provisional application No. 60/363,568, filed on Mar. 13, 2002.

(51) Int. Cl.[7] .............................................. G02F 1/035
(52) U.S. Cl. ................................ 385/2; 385/1; 385/40; 385/41
(58) Field of Search .............................. 385/1, 2, 3, 15, 385/16, 40, 41, 129, 130, 131

(56) References Cited

U.S. PATENT DOCUMENTS

| | | | |
|---|---|---|---|
| 3,710,063 A | | 1/1973 | Aine ........................ 219/10.15 |
| 4,119,930 A | * | 10/1978 | Abrams et al. ............. 359/245 |
| 5,347,392 A | * | 9/1994 | Chen et al. ................. 359/279 |
| 5,414,552 A | | 5/1995 | Godil .......................... 359/247 |
| 5,787,211 A | | 7/1998 | Gopalakrishnan .............. 385/2 |
| 6,351,326 B1 | * | 2/2002 | Morse et al. ................ 359/245 |
| 6,504,640 B2 | | 1/2003 | Gopalakrishnan ........... 359/245 |
| 6,529,646 B1 | * | 3/2003 | Wight et al. .................... 385/1 |
| 2003/0215170 A1 | * | 11/2003 | Hum et al. ..................... 385/2 |

OTHER PUBLICATIONS

Performance and Modeling of Resonantly Enhanced $LiNbO_3$ Modulators for Low–Loss Analog Fiber–Optic Links, Ganesh K. Gopalakarishnan and William K. Burns, IEEE Transactions on Microwave Theory and Techniques, vol.42, No. 12, Dec. 1994, p. 2650–2656.

Electro–optic Modulators for Radio–on–Fiber Applications, Sean V. Hum, MSc. Thesis, University of Calgary, Dec. 2001 (catalogued ~Jul. 2002).

Fabry–Perot Type Resonantly Enhanced Mach–Zender Modulator, Y. S. Visagathilar, A. Mitchell, R. B. Waterhouse, MWP'99 Digest, pp. 17–20, 1999.

(List continued on next page.)

Primary Examiner—Brian M. Healy
(74) Attorney, Agent, or Firm—Christensen O'Connor Johnson Kindness PLLC

(57) ABSTRACT

An electro-optic modulator structure for particular use in narrowband optical subcarrier systems. A traveling wave is established across the active region of the device, instead of a standing wave. This is accomplished through the use of a directional resonator structure that prevents reverse-traveling waves from being established within the resonator. Hence, the electric field is applied to the traveling optical wave in a similar fashion to a traveling-wave modulator, except that the traveling wave has a much greater amplitude due to the build-up of energy inside the resonator. Since the modulator is operated in a traveling-wave fashion, it can be tuned to operate at any frequency using tuning elements, regardless of the length of the active region. Furthermore, the microwave and optical signals can be velocity-matched to mitigate optical transit time effects that are normally associated with a resonant modulator utilizing a standing-wave electrode structure.

14 Claims, 7 Drawing Sheets

OTHER PUBLICATIONS

20 GHz Optical Waveguide Sampler, Lynne A. Molter–Orr, Hermann A. Haus, Frederick J. Leonberger, IEEE Journal of Quantum Electronics, vol. QE–19, No. 12, Dec. 1983.

Traveling–Wave Resonators, L. J. Milosevic, R. Vautey, IRE Transactions on Microwave Theory and Techniques, vol. 6, pp. 136–143, Apr. 1958.

Resonance Properties of Ring Circuits, Friedrich J. Tischer, vol. 5, pp. 51–56, Jan. 1957.

Field Theory of Guided Waves, Collin, pp. 433–441, Wiley–IEEE Press, New York, 1991.

Fields and Waves in Communication Electronics, Ramo, Whinnery, Van Duzer, pp. 511–533, John Wiley and Sons, New York, 1965.

* cited by examiner

ELECTRO-OPTIC MODULATOR WITH RESONATOR

CROSS-REFERENCE TO RELATED APPLICATION

This application claims the benefit of the filing date of U.S. Provisional Application No. 60/363,568, filed Mar. 13, 2002.

BACKGROUND OF THE INVENTION

There is a strong need to reduce the switching voltage, or $V_\pi$, of electro-optic modulators used in optical communication systems. Electro-optic modulators with reduced switching voltages have increased conversion efficiency and do not require high power driver stages at the modulator input. This disclosure presents a modulator structure that directly benefits narrowband optical subcarrier systems, where only a fraction of the available modulator bandwidth is utilized about a center frequency. One such application is the optical distribution of radio signals. The potential of these systems is expanding, particularly for distributing signals in local multipoint distribution systems (LMDS's) which deliver broadband data services over a wireless link to the home. The switching voltage of the modulator has a significant impact on the performance of these distributions systems, particularly with respect to the link loss between the transmitter and receiver. High switching voltages lead to very high link loss, even over insignificant lengths of fiber, with typical losses being 25–50 dB for modern optical intensity modulators. Another application is optical pulse generators, where electro-optic modulators are driven by sinusoidal signals and their nonlinear nature is exploited to generate narrow optical gating functions. This application also benefits from devices with low switching voltages since the drive requirements for such systems are very demanding.

One of the most common realizations of an electro-optic modulator is an optical phase modulator, shown in FIG. 1. This modulator consists of an optical waveguide 10 with an optical input 6 and an optical output 8, formed from an electro-optic material and an electrode structure 12 that develops an electric field across the waveguide 10 in accordance with an electrical signal applied to the electrode 12 from the signal input 5. The electric field changes the refractive index of the electro-optic material in a linear fashion so that the phase imparted to the outgoing optical wave is directly proportional to the applied electrical signal. Phase modulation of the optical wave can in turn be used for the transmission of information in an optical communication system, most commonly through the use of Mach-Zehnder interferometers which use multiple optical phase modulators to achieve intensity and/or phase modulation of an optical wave.

In traditional modulator structures, the electrode 12 is terminated in an impedance 14 matched to the characteristic impedance of the electrode 12 so that the applied electrical signal travels along the length of the electrode 12 and is fully absorbed by the termination 14. Such an electrode structure 12 is known as a traveling-wave electrode. If the velocities of the electrical signal propagating along the electrode and the optical wave traveling in the electro-optic material are matched, this structure yields a very high modulation bandwidth. However, this structure is not optimally suited for narrowband applications because the broadband nature of the modulator is achieved in exchange for a relatively high switching voltage. The main reason for this is that most of the power in the electrical signal applied to the electrode 12 is dissipated in the termination 14, leading to relatively small electric fields being established across the optical waveguide 10. This in turn, yields a weak electro-optic effect, increasing the switching voltage of the device, and necessitating the use of high power amplifier stages at the input to the modulator in order to achieve the desired modulation depth.

This situation can be improved significantly by employing resonant modulator electrodes, which reduce the switching voltage of an electro-optic modulator over a narrow frequency band. In such structures, such as the one shown in FIG. 2, the termination at the end of the modulator electrode 12 is removed and replaced with an electrical reflector 16 such as an open or a short, and a coupler 18 is introduced between the signal input 5 and the input to the electrode 12 so that the electrode 12 is transformed into a resonator The electrically sensitive, or active, region 17 of the modulator has a length L. The active region may be surrounded by sections of electrode 12 that do not influence the optical wave traveling in the waveguide, marked as passive regions 20 in the diagram. The output of the electrode 12 is connected to the electrical reflector 16, having a reflection coefficient $\Gamma_L$, while the input of the electrode is connected to the coupler 18 which couples electromagnetic energy into the resonator It has a reflection coefficient $\Gamma_C$.

The arrangement of the reflector 16 and the coupler 18 traps microwave energy inside the resonator. Waves that are admitted into the resonator travel forward towards the reflector 16, where they are reflected. The reverse-traveling waves travel back towards the coupler 18, where they are re-reflected into the resonator. This continual feedback process establishes many forward- and reverse-traveling waves within the resonator. Over a small frequency range, the superposition of these waves yields a standing wave within the resonator. The coupler 18, realized, for instance, with a reactive component such as a series capacitor or shunt inductor, is chosen so that the resonator is critically coupled. Under this condition, a conjugate match exists between the source and the resonator, resulting in maximum energy transfer between the drive circuitry and the resonator. This resulting standing wave in the resonator has a very large amplitude relative to the applied signal, leading to much greater fields being established across the active region of the modulator than can be achieved with a standard traveling-wave structure. This reduces the switching voltage of the modulator considerably. Resonant electrode structures have been investigated in the literature quite extensively; see G. K. Gopalakrishnan and W. K. Burns, "*Performance and Modeling of Resonantly Enhanced LiNbO₃ Modulators for Low-Loss Analog Fiber-Optic Links*", IEEE Transactions on Microwave Theory and Techniques, vol. 42, no. 12, pp. 2650–2656, December 1994, Y. S. Visagathilagar, A. Mitchell, and R. B. Waterhouse, "*Fabry-Perot Type Resonantly Enhanced Mach-Zehnder Modulator*", MWP'99 Digest, pp. 17–20, 1999.

The resonator arrangement shown in FIG. 2 is known as a linear resonator. Alternatively, a resonator can be formed by forming the resonant element into a loop to form a ring resonator, as shown in FIG. 3, with signal input 5, where part of the transmission line composing the ring is coupled through coupler 24 to the active section 17 of the modulator, again surrounded with possible passive regions 20. Regardless of the implementation, the net result is the establishment of a standing wave across the active region of the modulator which improves the response of the modulator at specific frequencies. Resonant modulators have been explored in a number of patents; see G. K. Gopalakrishnan, "Optical modulator for CATV Systems", U.S. Pat. No. 5,787,211, 1998. The fields in a resonant structure can also be applied using microwave waveguides instead of planar structures, as in A. A. Godil, "Partially Loaded Microwave Waveguide Resonant Standing Wave Electro-Optic Modulator", U.S. Pat. No. 5,414,552, 1995.

Resonant modulators work by sacrificing the bandwidth of a traveling-wave modulator for a reduced switching voltage over a specific frequency band. Since the systems being considered here are inherently narrowband, this tradeoff is inconsequential. However, there are several issues that limit the performance of resonant modulators. First, the upper frequency at which a resonant modulator can operate is constrained by the resonator length. Although any number of wavelengths can be established inside the microwave resonant circuit, for maximum modulator response, the resonator length must be chosen so that approximately half the wavelength associated with the target frequency to be used with the device is established across the active region of the device (i.e. $L=\lambda/2$, where $\lambda$ is the wavelength of the electrical signal at resonance). At high frequencies, this requires that the active region of the modulator be very short. However, shortening the interaction length of the modulator increases the overall switching voltage of the device and can reduce or nullify the improvements introduced by resonant enhancement. Keeping the interaction length constant and utilizing higher order resonator modes results in a degraded response compared to the case when a half-wavelength field profile is developed over the active region length. Hence, it would be desirable if the interaction length of the device could be kept constant at a specific length to yield a given switching voltage while eliminating the constraint that a half-wavelength be developed across the interaction length of the modulator at the desired resonant frequency.

Second, since it takes an optical wave a finite amount of time to traverse the active region of an electro-optic modulator, transit time effects limit the amount of enhancement offered by a resonant modulator, especially at very high frequencies. These effects are present because fundamentally a resonant electrode cannot be velocity-matched to the optical wave because the standing wave established across the resonant electrode is a superposition of forward- and reverse-traveling waves. The reduction in modulator response caused by this effect is well documented in, for example, L. A. Molter-Orr, H. A. Haus, and F. J. Leonberger, "20 *GHz Optical Waveguide Sampler*", IEEE Journal of Quantum Electronics, vol. QE-19, pp. 1877–1883, December 1983.

Given these constraints, it is an object of the present invention to achieve the following:

1. Provide an electrode structure offering all the advantages of traditional resonant electrode structures, while possessing an arbitrary interaction length. That is, the interaction length of this modulator is not constrained to be $\lambda/2$ at the desired resonant frequency of the device. Arbitrary interaction lengths also enable the resonant frequency of the device to be variable.
2. Provide an electrode structure that is immune to, or substantially less affected by, optical transit time effects that limit the performance of traditional resonant electrode structures.

Traditional resonant modulators develop a standing wave electric field pattern across the active region of the modulator. While the amplitude of the standing wave is much larger than that achievable with traveling-wave modulators, the length of the active region cannot exceed $\lambda/2$, otherwise the additional modulation depth achieved by the resonant electrode configuration will be lost.

SUMMARY OF THE INVENTION

The proposed structure differs significantly from a traditional resonantly-enhanced modulator in that a traveling wave is established across the active region of the device, instead of a standing wave. This is accomplished through the use of a directional resonator structure that prevents reverse-traveling waves from being established within the resonator. Hence, the electric field is applied to the traveling optical wave in a similar fashion to a traveling-wave modulator, except that the traveling wave has a much greater amplitude due to the buildup of energy inside the resonator. Since the modulator is operated in a traveling-wave fashion, it can be tuned to operate at any frequency using tuning elements, regardless of the length of the active region. Furthermore, the microwave and optical signals can be velocity-matched to mitigate optical transit time effects that are normally associated with a resonant modulator utilizing a standing-wave electrode structure.

BRIEF DESCRIPTION OF THE DRAWINGS

There will now be described preferred embodiments of the invention, by reference to the drawings, for illustration only, in which like reference characters denote like elements and in which.

DETAILED DESCRIPTION OF PREFERRED EMBODIMENTS

In the claims, the word comprising is used in its inclusive sense and does not exclude other elements being present. The indefinite article "a" preceding an element in the claims does not exclude more than one of the element being present.

Figure 4:
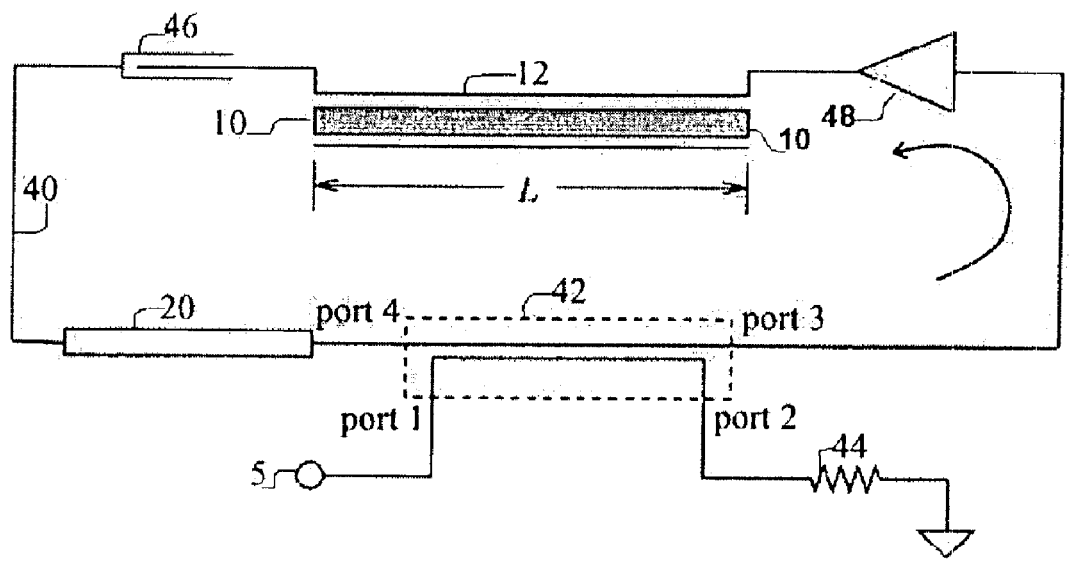
FIG. 4 shows a traveling wave resonant electrode structure according to the invention using a directional coupler.

Several unique structures can be used to achieve traveling-wave resonance inside a microwave resonator. The first two structures discussed here are based on a ring resonator implementation of the resonant electrode. The first structure is shown in FIG. 4, and is based on the traditional implementation of a traveling-wave resonator documented in the literature on traveling wave resonators (for example, see the paper by L. J. Milosevic and R. Vautey entitled "*Traveling-Wave Resonators*", IRE Transactions of Microwave Theory and Techniques, vol. 6, pp. 136–143, April 1958, or "*Resonance Properties of Ring Circuits*" by F. J. Tischer, IRE Transactions on Microwave Theory and Techniques, vol. 5, pp. 51–56, January 1957).

In this ring structure 40 shown in FIG. 4, the input signal from input 5 is applied to a directional coupler 42 at port 1. In a directional coupler structure 42, most of the applied energy propagates to port 2 of the coupler 42, and is absorbed by the matched load 44 at the end of the line. A fraction of the applied energy is coupled to port 3 of the coupler 42. This energy travels around the ring structure 40 shown in the counter clockwise direction. Part of the ring circuit 40 is formed by an electrode 12 coupled to the active region 10 of the modulator so that the traveling-wave in the ring circuit 40 co-propagates with the optical signal and modulates the phase of the optical wave. When this signal reaches port 4 of the coupler 42, some of the energy is coupled out of port 2 through matched load 44 by the same coupling factor as from port 1 to 3. However, most of the energy remains within the ring 40. At the resonant frequency of the ring 40, the signal entering port 4 of the directional coupler 42 and the signal being coupled into the ring from port 1 are in perfect phase, such that the signals combine constructively and produce a traveling-wave signal in the ring 40 with increased amplitude. This increased amplitude signal travels through the ring 40 many times, each time picking up more energy from the signal being coupled in from port 1. If the coupling parameter C of the directional coupler 42 is chosen so that $C=(1-e^{-2\alpha L})^{-1}$, where $\alpha$ is the attenuation of the resonant structure in Np/m and L is the length of the resonator in m, the resonator will be critically coupled. Under this condition, the amplitude of the signal will be $(1-e^{-2\alpha L})^{-1/2}$ times greater than that of the incident signal, resulting in an increased modulation effect compared to a non-resonantly-enhanced modulator with an active region of the same length. If the resonator is velocity-matched to the optical waveguide 10, the switching voltage of the modulator is reduced by the same factor.

Generalized traveling-wave structures realized in this fashion have been proposed previously for entirely different applications. For example, in the aforementioned paper by L. J. Milosevic and V. Vautey, the power gain offered by the traveling-wave ring resonator was applied towards high power testing of microwave transmitters. Another application of this circuit was explored by H. E. Aine for providing a means of applying a high-power microwave energy uniformly to sheets of material (see "Microwave Applicator", U.S. Pat. No. 3,710,063). However, this structure has not been applied towards resonantly-enhanced electro-optic modulators, and has particular advantages over traditional resonant modulators. Since the structure establishes a traveling-wave over the active region of the modulator, the constraint on the active region length traditionally associated with resonant modulators is eliminated. The structure is also matched over all frequencies, unlike a resonant modulator which is only matched around the resonant frequency of the structure. This is possible through the use of the matched load 44 terminating port 2 of the directional coupler 42, which dissipates microwave energy from the coupler 42 when the ring structure 40 is not at resonance. At resonance, however, all the energy applied to the ring structure 40 is absorbed by the losses in the ring circuit 40, and no energy is dissipated by the matched load 44. Hence, all the applied power is contributing towards the modulation of the optical wave at the resonant frequency of the modulator.

An additional advantage of the traveling wave structure is that parameters of the resonator can be changed quite easily by adding the optional phase shifting and amplification components shown in FIG. 4. An optional low-loss phase shifter 46 can be added in the ring structure 40 in order to adjust the resonant frequency of ring circuit 40 without any other adaptations of the circuit. To change the resonant frequency of traditional resonant electrodes would require the coupler 18 shown in FIG. 2 to be re-tuned to re-establish critical coupling of the resonator. This adjustment can be difficult unless tunable components are used to realize the coupler, placing the proposed circuit at a significant advantage over the traditional implementation. Furthermore, traditional standing-wave modulators would not normally be realized in tunable form since for optimum performance their resonant frequency must be fixed so that $\lambda=2L$.

An optional gain stage 48 in the ring structure 40, also shown in the diagram, can be used to the overcome losses in, and control the bandwidth of, the ring circuit 40, improving the quality factor of the resonator and dramatically increasing the modulation gain of the circuit. The modulation gain achievable from this configuration exceeds that which could be produced by an identical gain stage at the input to the structure 40. Introducing gain into the resonator does require the coupling parameter of the directional coupler 42 to be changed to take into account reduced losses in the ring circuit 40. The required coupling parameter can be determined using the effective attenuation constant of the resonator after the gain element 48 has been introduced, and substituting it into the original formula for the critical coupling condition ($C=(1-e^{-2\alpha L})^{-1}$).

Figure 5:
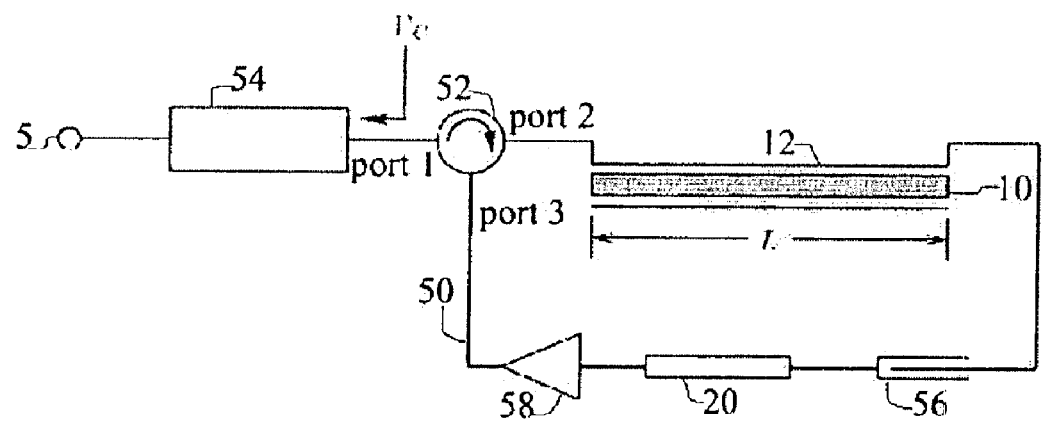
FIG. 5 shows a traveling wave resonant electrode structure according to the invention using a circulator.

Another implementation of a traveling-wave resonator is shown in FIG. 5, and achieves the same effect as the structure just described using different components. The ring structure 50 of FIG. 5 includes a circulator 52, which is a nonreciprocal component that only allows energy flow in a certain direction, and a coupler 54 similar to that used for standing-wave resonators, with the signal input 5. During operation, a fraction of the incident signal is admitted into the microwave resonator circuit by the coupler 54, and enters port 1 of the circulator 52. The circulator 52 transmits the wave from port 1 to port 2, after which the signal enters the modulator electrode 12 and subsequent active region 10 of the device. The electrical signal co-propagates with the optical wave, and modulates its phase as it travels along the length of the electrode 12. The signal then exits the modulator electrode 10 of the modulator and passes through a phase shifter 56 and/or amplifier 58 in the ring structure 50, which are used for the same purposes as the directional-coupler-based traveling-wave resonator of FIG. 4, and feed circulator 52 at port 3. The signal is then transmitted from port 3 back to port 1, where it is output and reflected by the coupler 54 back into the ring structure 50, and the cycle resumes. The superposition of all the waves in the resonant structure leads to large field amplitudes being developed across the active region of the device, enhancing the modulation effect in the same way as the first structure described earlier.

The coupler 54 for this configuration serves the same general purpose as the coupler 18 used in a traditional linear resonator. It provides a conjugate match between drive circuitry and the composite circuit seen looking into port 1 of the circulator loop circuit shown in the diagram. The input reflection coefficient of the configuration looking into port 1 of the circulator 52 is $\Gamma=e^{-(\alpha+j\beta)L}$, where $\beta$ is the phase constant of the ring circuit 50 at resonance. Therefore, any circuit that, when looking back into the circuit and source from port 1 of the circulator, provides a reflection coefficient equal to $\Gamma^* = e^{-(\alpha - j\beta)L}$ can be used as the coupler 54 to the circuit. Like the linear resonator, generally this is achieved using a reactive component such as a shunt inductor or series capacitor, with the inductance or capacitance chosen to provide the necessary reflection coefficient.

Unlike the configuration shown in FIG. 4, the structure shown in FIG. 5 is only matched to the source near the resonant frequency of the ring circuit 50. Furthermore, changes to the ring circuit 50 for example effected through the phase shifter and/or amplifier require the coupler 54 to be re-tuned to achieve critical coupling into the resonator since the input reflection coefficient of the ring circuit 50 changes when parameters of the ring circuit 50 change. Hence, the resonant frequency of the circuit cannot be changed as easily as the circuit 40 shown in FIG. 4. However, it still provides an effective means improving the performance of electro-optic modulators over fixed frequency ranges.

The key to the operation of both these structures is a directional element 42, 52 which only allows energy to travel between specific ports in certain directions. In the case of the directional coupler 42, ideally energy can only couple from port 1 to port 3, and from port 4 to port 2. Similarly, the circulator 54 only allows power flow from ports 1 to 2, 2 to 3, and 3 to 1. These structures produce traveling waves propagating in a single direction in the ring circuits 40, 50: counter clockwise in FIG. 4 and clockwise in FIG. 5. Any counter-propagating signals are suppressed, eliminating the formation of a standing wave that is normally established by the superposition of both clockwise- and counter clockwise-propagating waves. Elimination of a standing wave pattern allows the modulator to be operated in a traveling-wave manner, which eliminates constraints on the length of the active region of the modulator and allows the modulator to operate at any resonant frequency up to the bandwidth of the modulator electrode 10 itself.

Figure 6:
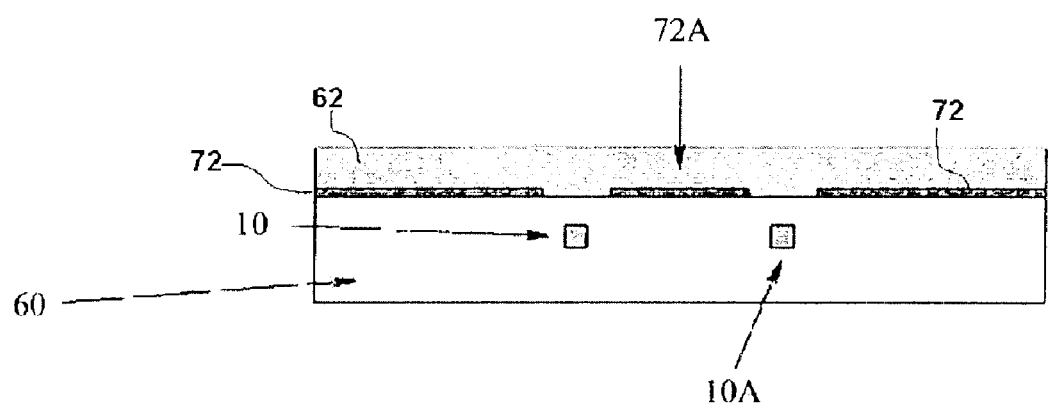
FIG. 6 shows a cross-section of a distributed traveling wave resonant structure according to the invention.
Figure 7:
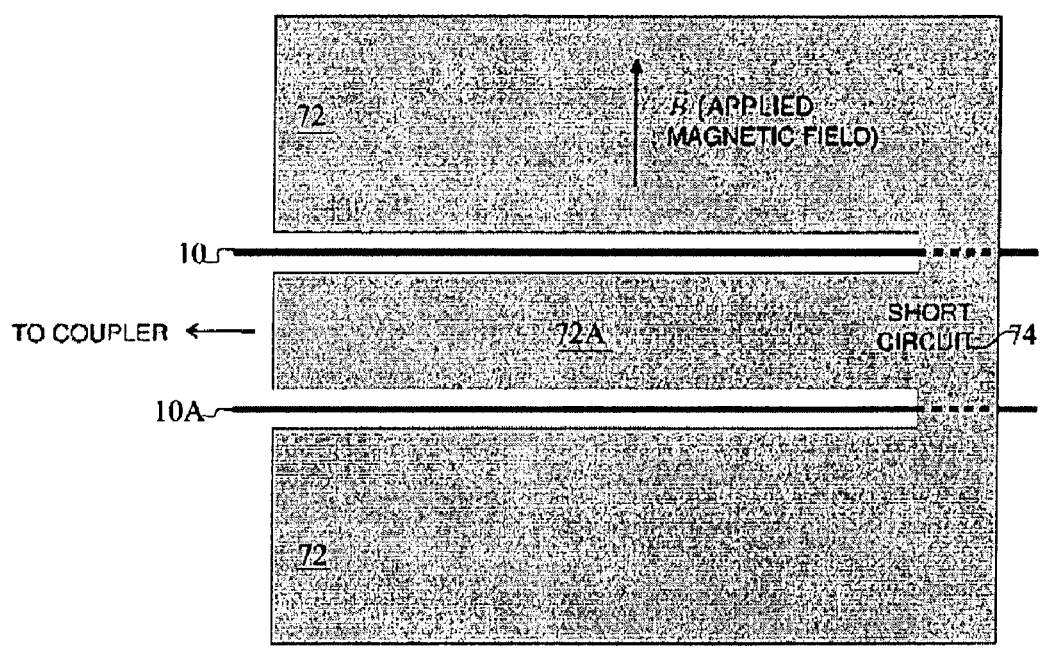
FIG. 7 shows a top view of a distributed traveling wave resonant structure according to the invention.

A third embodiment of a traveling-wave resonator is realized in distributed form in FIGS. 6 and 7 where electro-optic material 10 is embedded in a cladding 60 on which modulator electrodes 72 are formed. In this implementation, a layer of gyromagnetic or gyroelectric material 62 is deposited near the transmission line formed by the electrodes 72, and a steady (DC) magnetic field B is applied across the transmission line perpendicular to the direction of propagation. This modifies the electric field distribution of the propagating electromagnetic mode so that it becomes spatially dependent on the direction the wave is traveling. That is, a forward-traveling wave will produce a different spatial distribution of electric field compared to a wave traveling in the reverse direction. This effect can be used to isolate the forward- and reverse-traveling waves so that they do not combine to form a standing wave in a resonator. The effect is made possible through the use of gyromagnetic or gyroelectric materials 62, whose permeability or permittivity tensors depend on the parameters of a magnetic field B applied across the material, respectively. The dependence of these tensors on the applied magnetic field influences the electric field distribution of the electromagnetic mode employed.

We take advantage of the field displacement effect induced by magnetized gyromagnetic material 62, whereby the propagation constant and the distribution of electromagnetic wave energy in the cross-section of the transmission line becomes nonreciprocal, that is, it depends on the direction of propagation. These effects (one or both) are well known in the prior art in the context of microwave and millimeter wave devices, such as field effect isolators and circulators, phase shifters or tunable resonators.

In the present embodiment, of prime importance is the field displacement effect (rather than non-reciprocal propagation constant), whereby gyromagnetic material is used to displace the field and thereby couple, or de-couple the RF wave with the optical waveguide 10 in the structure of the modulator. Specifically, the wave going in one direction will be strongly coupled with optical waveguide 10, but going in the opposite direction will experience much weaker interaction with electro-optic material 10. In consequence, the waves going in opposite directions in the resonator will have energy concentrated in different areas, thus significantly reducing standing wave effects from the optical waveguide 10. See Ramo, Whinnery, Van Duzer: "Fields and Waves in Communication Electronics", John Wiley & Sons, NY, 1965, or Collin: "Field Theory of Guided Waves", Wiley-IEEE Press, 1990.

A traveling-wave resonator is formed using the transmission line formed by the electrodes 72 using an electrical reflector and coupler positioned at opposite ends of the modulator electrode 72 in the same fashion as a linear resonator. The effect induced by the gyromagnetic/gyroelectric layer 62 is used to isolate the forward- and reverse-traveling waves and prevent standing-wave operation of the linear resonator. One of the isolated waves can then be used to modulate the phase of the optical wave in a traveling-wave fashion. In principle, the net effect is identical to the structures of FIGS. 4 and 5, except that the isolation of the forward- and reverse-traveling waves is accomplished using a distributed structure.

In the example of a distributed traveling-wave resonant electrode structure realized in this manner as shown in FIGS. 6 and 7, a coplanar waveguide (CPW)-based traveling-wave resonator has been illustrated. In CPW electrode-based modulators, an electric field is established around the electrodes 72, and one or more electrically-sensitive optical waveguides 10, 10A placed in the established fields to produce an optical phase modulator. Often, two waveguides 10, 10A are used as shown in the diagram so that fields established on either side of the centre electrode 72A can be exploited in the electro-optic modulation process. If the two waveguides 10, 10A form branches of a standard Mach-Zehnder interferometer, this yields a push/pull modulator design.

Figure 1:
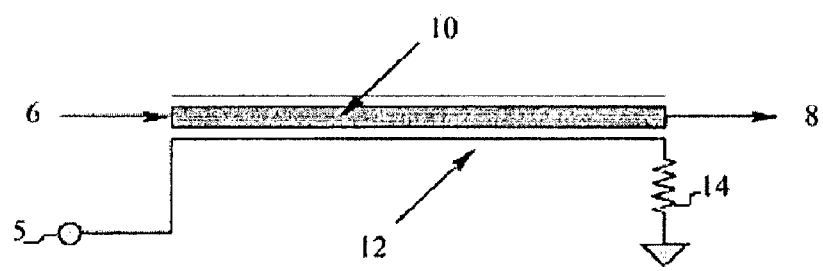
FIG. 1 shows a prior art optical phase modulator.
Figure 2:
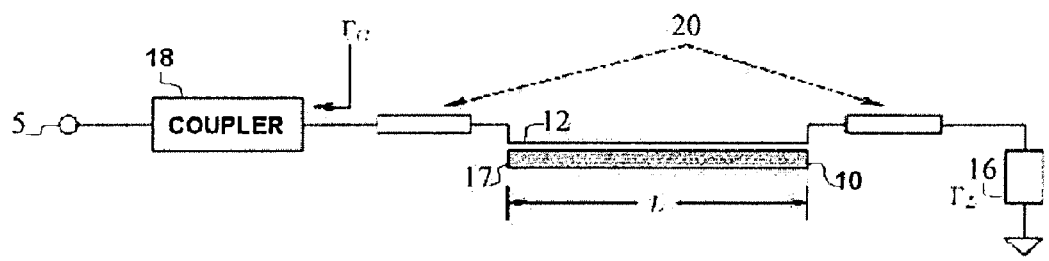
FIG. 2 shows a first prior art resonant electrode structure for an optical phase modulator based on a linear resonator.
Figure 3:
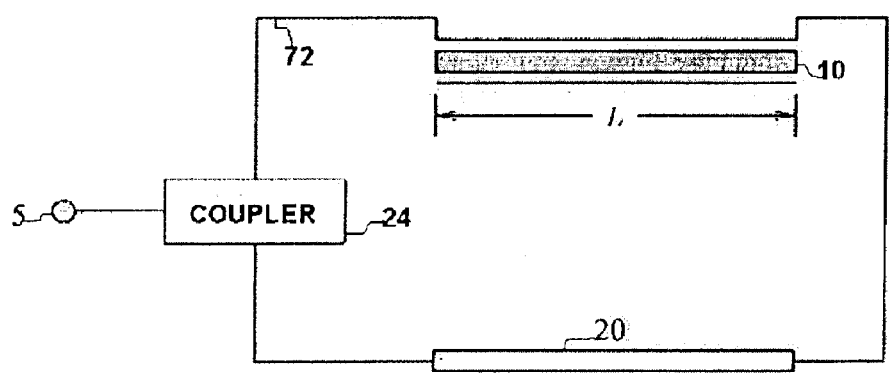
FIG. 3 shows a second prior art resonant electrode structure for an optical phase modulator based on a ring resonator.
Figure 8:
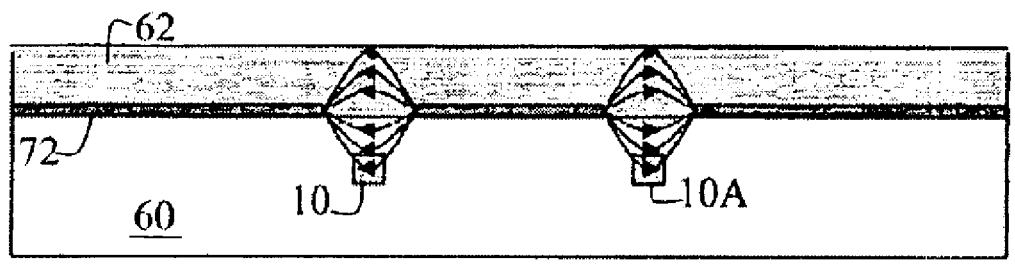
FIG. 8 shows an electric field distribution in a distributed CPW traveling wave resonant structure showing normal CPW operation.
Figure 9:
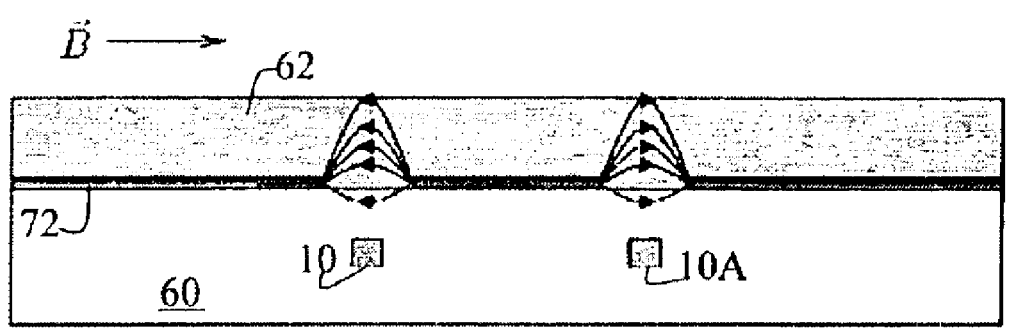
FIG. 9 shows an electric field distribution in a distributed CPW traveling wave resonant structure showing a reverse-traveling wave.
Figure 10:
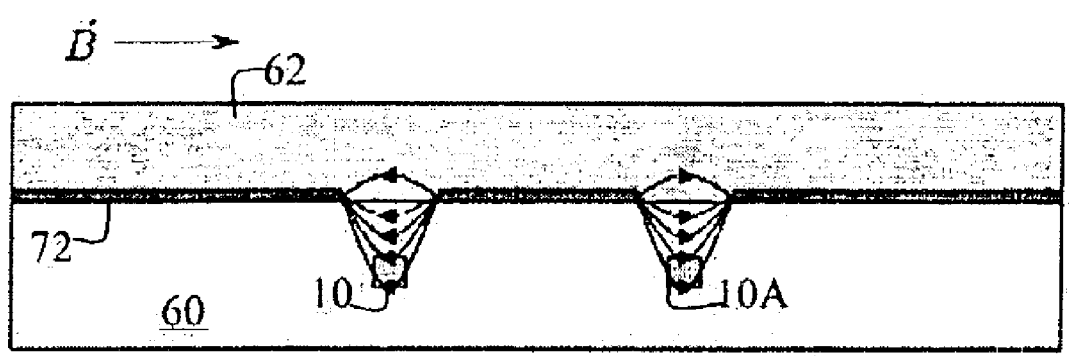
FIG. 10 shows an electric field distribution in a distributed CPW traveling wave resonant structure showing a forward-traveling wave.

The resonator is realized here in the same general way as the linear resonator shown in FIG. 2. An electric reflector 74 is realized using a short-circuit at the end of the CPW line, and a coupler (not shown) is introduced at the input to the electrode 72. In the prior art, that is, in the absence of the proposed gyromagnetic layer 62, a standing wave would be established along the length of the CPW electrode 72. However, the introduction of the gyromagnetic layer 62 above the CPW electrodes 72, which may be for example a ferromagnetic layer, produces two different electric field distributions of the CPW mode, when a steady magnetic field $B=B_0$ is applied to the structure by a magnetic field source such as a permanent magnet or electromagnet. Both the field and its source are symbolized by the letter B in the figure. The distribution of the mode depends on the direction the wave is traveling. This is demonstrated graphically in FIGS. 8–10. Without a DC magnetic field present (B=0), the forward- and reverse-traveling waves travel in the CPW using the electric field distribution shown in FIG. 8. With the magnetic field introduced in the direction shown, however, a forward-traveling-wave propagating towards the short 74 has an electric field distribution that is offset vertically in the direction of the cladding 60, corresponding to the situation shown in FIG. 10. Hence, electric fields are established across the electro-optic material and the modulation effect is strong. Once the wave is reflected by the short 74, the reverse-traveling wave establishes an electric field distribution offset vertically in the direction of the ferromagnetic layer, as shown in FIG. 9. Only weak electric fields are established across the optical waveguides 10, 10A in this case, producing little or no modulation of the optical wave. The reverse-traveling wave is then re-reflected into the resonator by the coupler (not shown) and the process repeats itself in the same manner as for a conventional linear resonator. The effect of the configuration is to separate the forward and reverse-traveling waves in the structure to prevent them from combining into a standing wave in any one spatial position. In this way, the forward-traveling-wave can be used to modulate the optical wave in a traveling-wave manner. Improvements in modulation depth are realized through the energy storage capability of the resonator in the same manner as the other traveling-wave resonator designs already discussed.

While the example shown here has shown a coplanar waveguide electrode structure 72, the implementation is not necessarily restricted to this type of transmission line, or even the structure shown. A similar effect could be realized with other transmission lines such as microstrip, coplanar slotline (CPS), etc., provided that the orientation of the magnetic field produces the desired spatial isolation of the forward and reverse-traveling waves. Additionally, the gyromagnetic layer 62 can be replaced with a gyroelectric layer (such as gallium arsenide) to achieve similar effects as those provided by a structure with a gyromagnetic layer, provided that the orientation and strength of the applied magnetic field are chosen correctly.

Field enhancement in all three structures discussed is achieved through the use of a microwave resonator which builds the amplitude of the wave(s) inside the resonator to higher levels at the resonant frequency of the structure. All the structures achieve field enhancement through the resonance effect but isolate a traveling-wave in the resonator to modulate the phase of the optical wave. It is in this manner that all the goals of the invention are achieved.

Immaterial modifications may be made to the invention disclosed without departing from the invention.

What is claimed is:

1. An electro-optic modulator, comprising:
   an optical waveguide having an active region; and
   a drive electrode structure disposed to apply an electric field to the active region and create a traveling wave resonant structure that increases electric fields established across the active region by the drive electrode structure.

2. The electro-optic modulator of claim 1 in which the drive electrode structure creates a traveling wave resonant structure using a ring circuit having a directional coupler to limit the direction of propagation of waves in the active region.

3. The electro-optic modulator of claim 1 in which the drive electrode structure creates a traveling wave resonant structure using a ring circuit having a circulator to limit the direction of propagation of waves in the active region.

4. The electro-optic modulator of claim 1 in which the drive electrode structure creates a traveling wave resonant structure using a field displacement effect.

5. The electro-optic modulator of claim 4 in which the field displacement effect is created by a material adjacent the drive electrode structure to which a magnetic field is applied, the material being selected from the group consisting of gyro-electric and gyro-magnetic materials.

6. The electro-optic modulator of claim 1 in which the drive electrode structure forms a Mach-Zehnder modulator.

7. An electro-optic modulator, comprising:
   an optical waveguide having an active region;
   a drive electrode structure disposed to apply an electric field to the active region, the drive electrode structure being formed as part of a resonant ring;
   a directional coupler in the resonant ring for coupling waves travelling in a single direction into and out of the resonant ring, such that, within the resonant ring, a travelling wave propagates the field strength of which is resonantly enhanced through multiple passes through the resonant ring; and
   a matched termination to the directional coupler for providing an input match over all frequencies for the directional coupler.

8. The electro-optic modulator of claim 7 further comprising a gain element in the resonant ring to improve modulation response of the electro-optic modulator.

9. The electro-optic modulator of claim 7 further comprising a phase shifting element in the resonant ring for shifting the resonant frequency of the electro-optic modulator.

10. An electro-optic modulator, comprising:
    an optical waveguide having an active region;
    a drive electrode structure disposed to apply an electric field to the active region, the drive electrode structure being formed as part of a resonant ring;
    a circulator in the resonant ring for coupling waves travelling in a single direction into and out of the resonant ring, such that, within the resonant ring, a travelling wave propagates the field strength of which is resonantly enhanced through multiple passes through the resonant ring; and
    a coupler for the resonant ring for trapping energy in the resonant ring to enhance the electric fields established across the active region of the electro-optic modulator by the drive electrode structure.

11. The electro-optic modulator of claim 10 further comprising a gain element in the resonant ring to improve modulation response of the electro-optic modulator.

12. The electro-optic modulator of claim 10 further comprising a phase shifting element in the resonant ring for shifting the resonant frequency of the electro-optic modulator.

13. An electro-optic modulator, comprising:
    an optical waveguide having an active region;
    a drive electrode structure disposed to apply traveling forward and reverse electric fields to the active region;
    the drive electrode structure containing a material selected from the group consisting of gyromagnetic or gyroelectric material for enhancing the effect of one of the forward and reverse traveling waves in the active region and diminishing the other of the forward and reverse traveling waves in the active region; and
    a source of a magnetic field placed to apply a magnetic field to the material.

14. The electro-optic modulator of claim 13 in which the material is formed in layers.

* * * * *